UNITED STATES PATENT OFFICE.

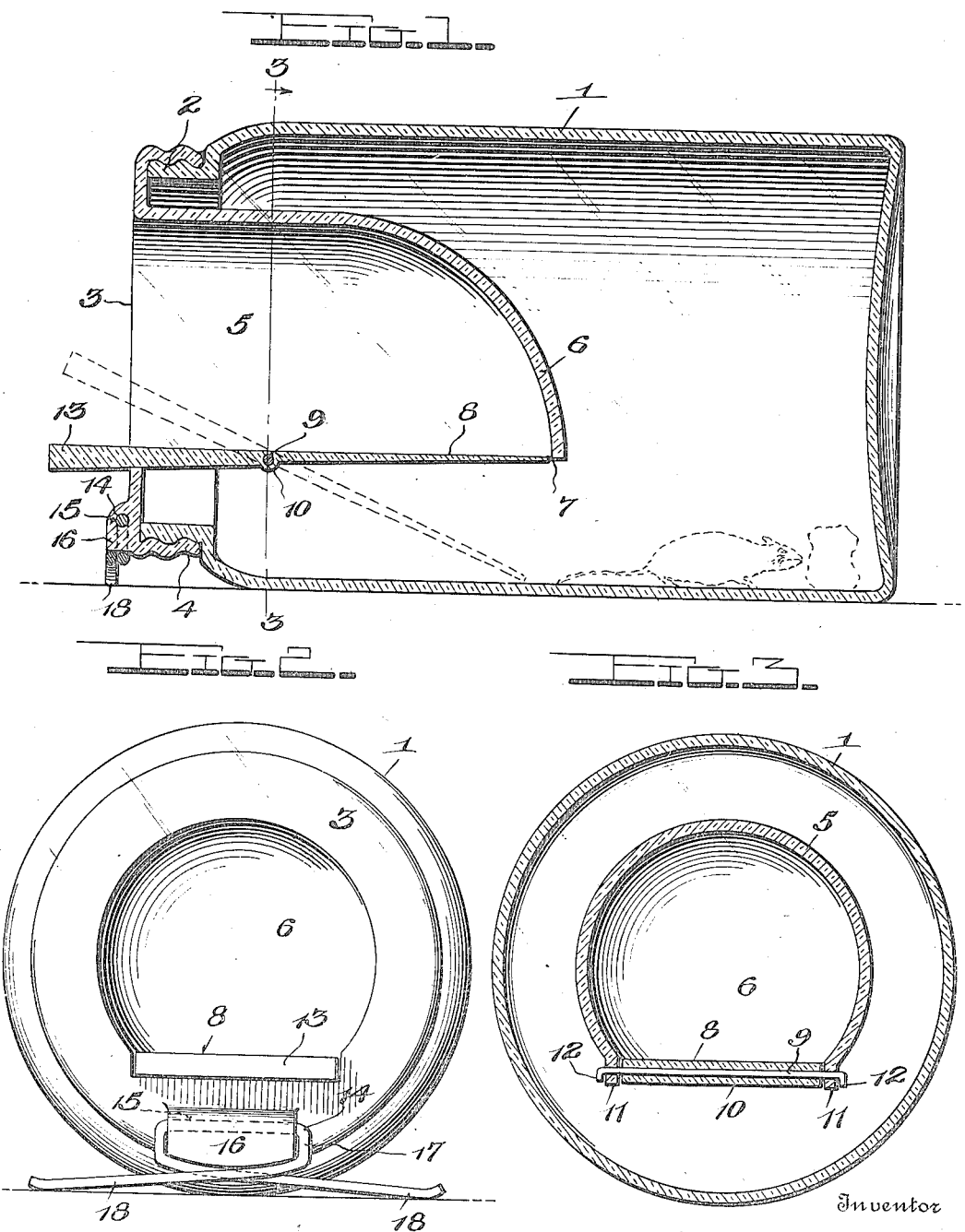

CHRISTOPHER C. HOVIS, OF SAN LUIS OBISPO, CALIFORNIA.

ANIMAL-TRAP.

1,213,876.　　　　　　Specification of Letters Patent.　　Patented Jan. 30, 1917.

Application filed July 25, 1916. Serial No. 111,227.

*To all whom it may concern:*

Be it known that I, CHRISTOPHER C. HOVIS, citizen of the United States, residing at San Luis Obispo, in the county of San Luis Obispo and State of California, have invented certain new and useful Improvements in Animal-Traps, of which the following is a specification.

This invention relates to improvements in animal traps and more particularly to one that is especially adapted for household use for catching mice.

The primary object of the invention is to provide a simple and effective trap of this character which may be made of glass and in few parts so that the device may be readily cleaned and kept in an entirely sanitary condition.

With these and numerous other objects in view, the invention consists of the certain novel features of construction, combination and arrangement of parts, which will be herein referred to and more particularly pointed out in the specification and claims.

In the accompanying drawings: Figure 1 is a vertical longitudinal sectional view through the trap embodying my invention; Fig. 2 is a front end elevation; and Fig. 3 is a transverse sectional view taken on the line 3—3 of Fig. 1.

Referring more particularly to the drawings, 1 denotes the body of the trap which is preferably in the form of an ordinary cylindrical fruit jar made of glass and having a slightly reduced and externally screw threaded neck 2.

A cap member 3 which forms the trap proper is adapted to close the neck 2 and it consists of an internally threaded ring or flange 4 formed integral with the flat central body portion of the cap 3 as clearly shown in Fig. 1. This cap member 3 is preferably formed of glass and also formed integrally with it is an entrance chamber 5 which extends longitudinally into the jar or body 1 and has a closed rear or inner end 6 and an open bottom 7.

The entrance member or passageway 5 is preferably of substantially circular shape in cross section as shown in Fig. 3 and its front end is entirely open as shown in Fig. 2 to permit the entrance of the mouse. The open bottom of the entrance chamber or member 5 is closed by a tilting trap door 8 which is likewise preferably made of glass and fulcrumed intermediate its ends by a pivot 9 made of wire and passed through transverse openings formed in a transverse bead or enlargement 10 on the bottom face of the platform 8 and also through apertured ears 11 formed on the bottom edge of the opposite side walls of the member 5, see Fig. 3, the ends of the pivot wire being bent angularly as at 12 to retain it in place. The forward or outer end 13 of the trap door 8 is made thicker than the inner end so that it will overbalance such end and normally retain the trap door in closed position although permitting the entrance of the animal when it passes on to the tapered end of the door to overbalance the same and move it to the dotted line position shown in Fig. 1 to discharge the mouse into the body of the trap as will be readily understood. The inner end of the trap door is of course shaped to correspond with the shape of the inner end of the member 5 and the outer end 13 is preferably rectangular in shape and projects beyond the flat outer face of the cap 3 as fully shown in Fig. 1.

To prevent the trap from rolling when the body or jar 1 is placed upon its side with the trap door 8 in its normal horizontal position, I provide a base member which is in the form of a piece of wire having its central portion 14 passed through a transverse opening 15 extending longitudinally through the upper portion of a substantially rectangular lug 16 formed integral with the front face of the cap 3 at its lower edge. The projecting portions of the wire are bent downwardly at right angles as shown at 17 into close engagement with the flat end walls of the lug 16 and the free ends 18 of the wire are then bent in opposite directions under the lugs 16 to snugly engage the same and thus prevent the wire from rocking on its central portion in the opening 15. These ends 18 of the wire project downwardly and outwardly in opposite directions, their extremities being in a plane tangential to the cylindrical outer surface of the body 1 so that the latter will be effectively prevented from rolling or rocking.

In operation, it will be seen that before securing the cap or trap on the jar 1, suitable bait is placed in the body of the same and when the device is placed on a floor or flat support in the position shown in the drawings, a mouse or the like can readily see the bait, the entire device being of transparent glass, and after jumping on the outer end 13 of the platform, passes inwardly beyond the pivot 9 whereupon it will be overbalanced and moved to the dotted line position in Fig. 1 throwing the mouse into the jar. The outer end 13 of the platform being heavier will immediately return the inner end to its closed position.

By having the device as shown and of glass, it will be noted that it is composed of but two pieces, with the exception of the two wire members 9 and 14, and hence may be quickly and easily cleaned and kept in an effective and sanitary condition. The construction shown also permits the parts to be easily assembled and the trap mechanism proper may be readily used in any fruit jar of the proper size.

I claim:—

1. The herein described sanitary trap having a body of transparent glass formed at one end with an opening, a cap member removably arranged on said open end and formed of transparent glass, said member having integrally formed with it an entrance portion which projects into the body and is closed at its top, sides and inner end, but provided with an open bottom, a trap door formed of a flat rectangular shaped piece of transparent glass of a size to cover the open bottom of said entrance portion and to project beyond the outer face of said cap member, said trap door having its outer end thick and being tapered from said end to its inner end to render said outer end heavier, said trap door being formed with a transversely extending pivot opening arranged at a point intermediate its ends and the side walls of said entrance portion of the cap member being formed with apertured pivot openings to aline with the opening in the trap door, and a pivot pin passed through said alined openings to pivotally mount the trap door.

2. In a trap, the combination of a transparent cylindrical jar having a threaded neck, a one-piece glass cap to screw on said neck and having a trap-door controlled entrance member, said cap being formed on its outer face near its bottom with an integral lug projecting outwardly from said face and of substantially rectangular shape, said lug having upright end walls, a longitudinal curved bottom and a transverse opening intersecting said end walls, and a wire passed through said opening in the lug and having its central portion positioned in said opening, the projecting end of the wire being bent downwardly at right angles into engagement with the flat end walls of the lug and then bent in opposite directions around the curved bottom of said lug to provide oppositely projecting supporting feet to prevent the jar from rolling.

In testimony whereof I affix my signature in the presence of two witnesses.

CHRISTOPHER C. HOVIS.

Witnesses:
L. A. ENOS,
LOIS B. ENOS.